F. H. BUCKINGHAM.
SCALE.
APPLICATION FILED MAY 8, 1911.
1,013,272.
Patented Jan. 2, 1912.
4 SHEETS—SHEET 1.
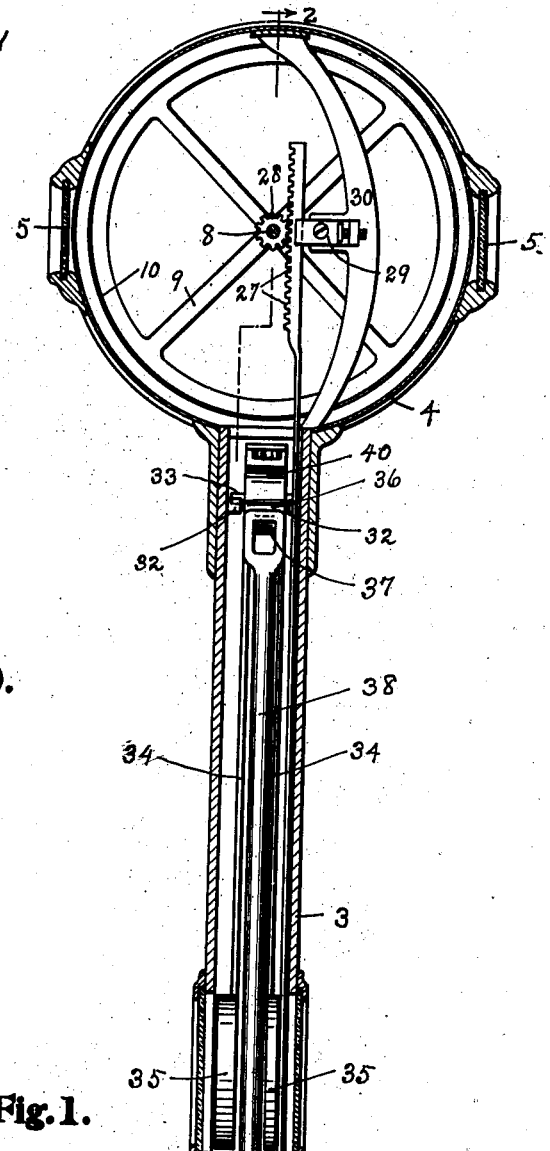
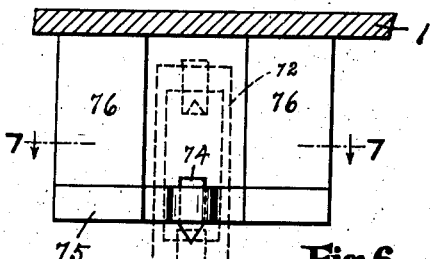
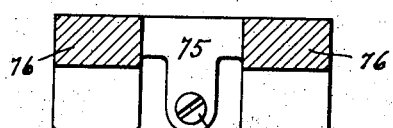
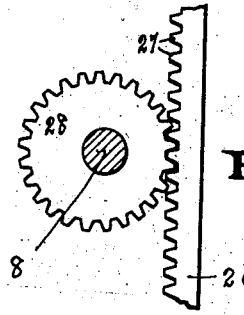
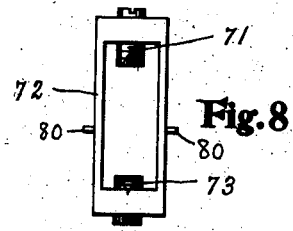
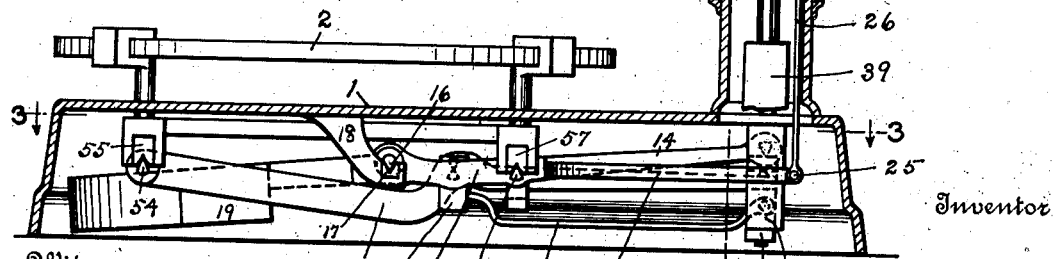
Fig. 6.
Fig. 7.
Fig. 9.
Fig. 8.
Fig. 1.
Witnesses
Albert A. Hofmann
Elizabeth M. Brown
Inventor
Fremont H. Buckingham
By Edward N. Pagelsen,
Attorney

F. H. BUCKINGHAM.
SCALE.
APPLICATION FILED MAY 8, 1911.

1,013,272.

Patented Jan. 2, 1912.
4 SHEETS—SHEET 3.

Witnesses
Albert A. Hofmann
Elizabeth M. Brown

Inventor
Fremont H. Buckingham
By Edward N. Pagelsen,
Attorney

F. H. BUCKINGHAM.
SCALE.
APPLICATION FILED MAY 8, 1911.

1,013,272.

Patented Jan. 2, 1912.

4 SHEETS—SHEET 4.

Witnesses
Albert A. Hofmann
Elizabeth M. Brown

Inventor
Fremont H. Buckingham
By Edward N. Pagelsen
Attorney

UNITED STATES PATENT OFFICE.

FREMONT H. BUCKINGHAM, OF DETROIT, MICHIGAN, ASSIGNOR TO STANDARD COMPUTING SCALE COMPANY, LIMITED, OF DETROIT, MICHIGAN, A LIMITED PARTNERSHIP.

SCALE.

1,013,272. Specification of Letters Patent. Patented Jan. 2, 1912.

Application filed May 8, 1911. Serial No. 625,757.

*To all whom it may concern:*

Be it known that I, FREMONT H. BUCKINGHAM, a citizen of the United States, and a resident of Detroit, in the county of Wayne and State of Michigan, have invented a new and useful Scale, of which the following is a specification.

This invention relates to computing scales provided with weight and cost indicating drums, and its object is to provide a "drum" scale having a load resisting pendulum with connecting mechanism between the levers and drum so constructed that the drum shall revolve in direct proportion to the load.

This invention consists in combination with the levers, indicator and pendulum, of novel connecting means between the pendulum and the levers and between the indicator and the levers.

It further consists in the novel connecting mechanism between the main and secondary levers, and for supporting the levers.

Figure 2:
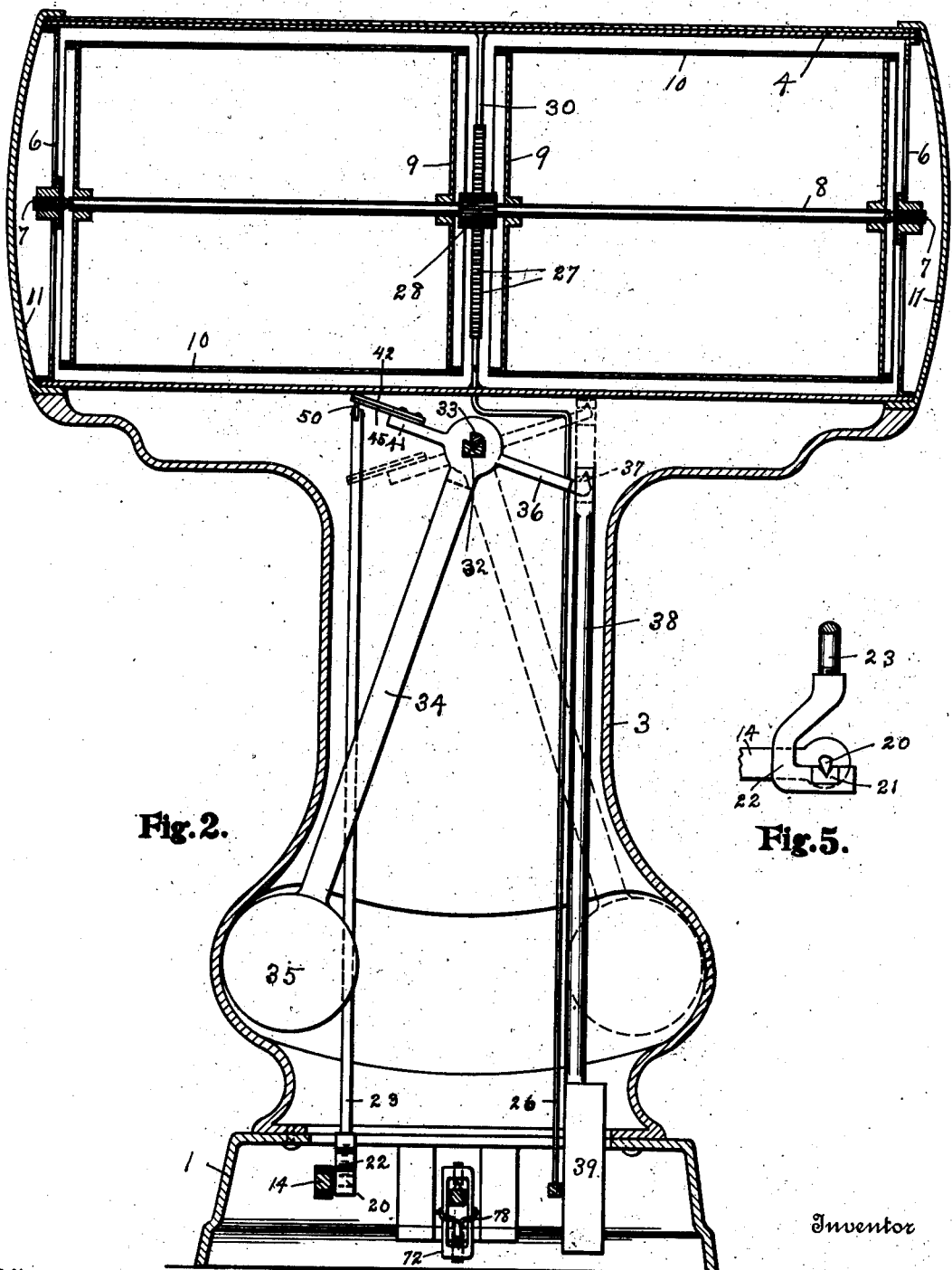
Figure 3:
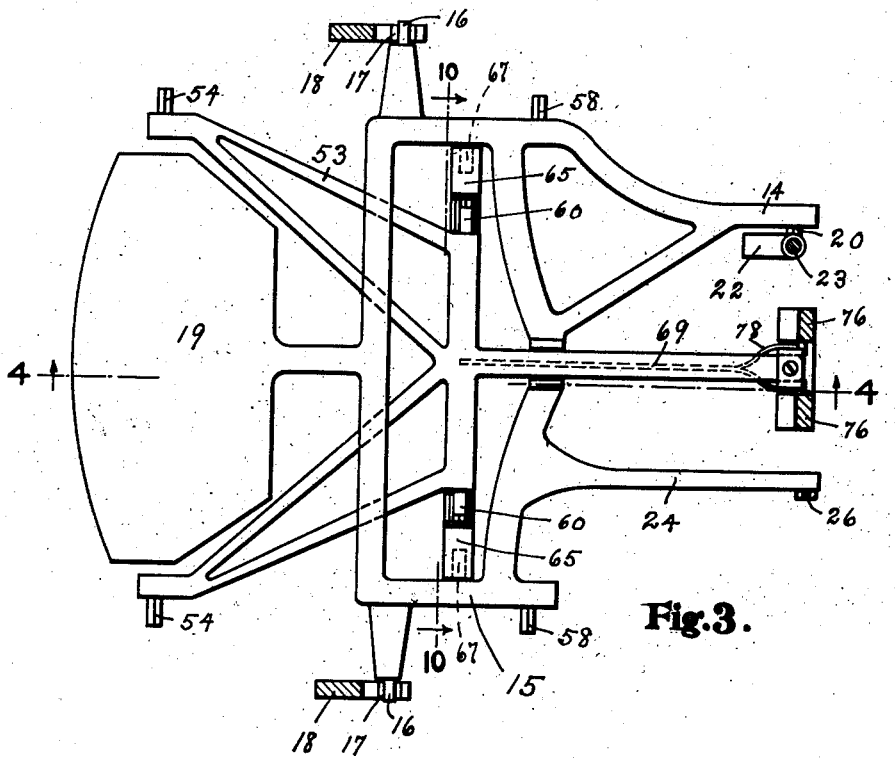
Figure 4:
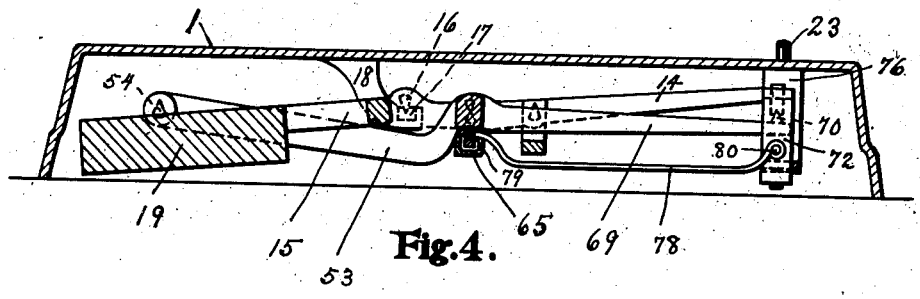
Figure 10:
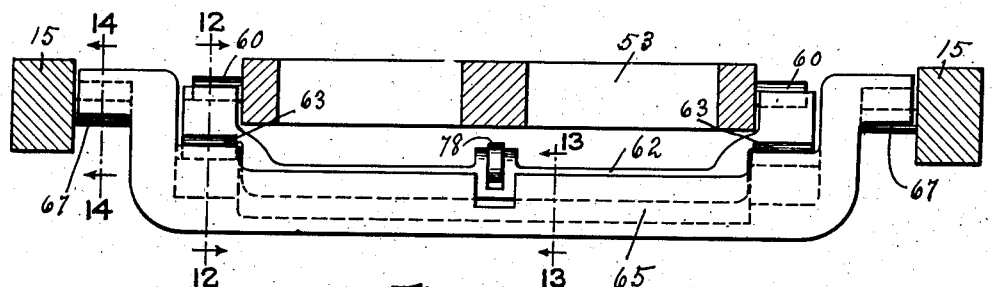
Figure 11:
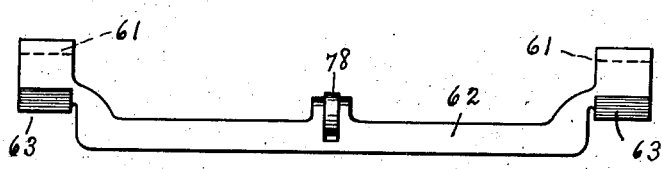
Figure 12:
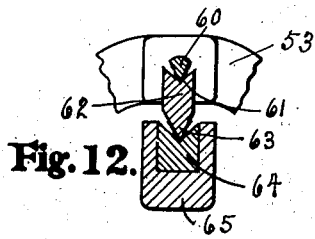
Figure 13:
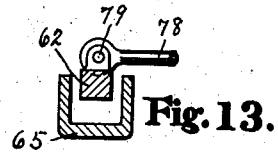
Figure 14:
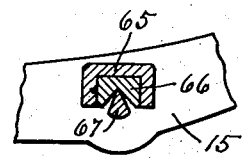
Figure 15:
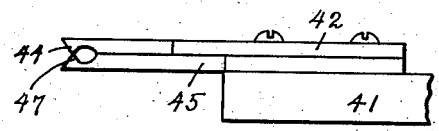
Figure 17:
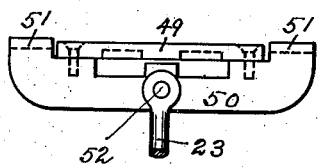
Figure 16:
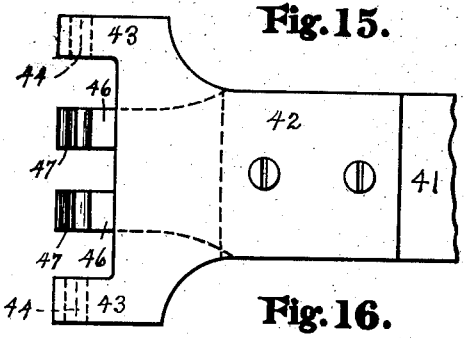

In the accompanying drawings, Figure 1 is a vertical longitudinal section of the scale. Fig. 2 is a transverse section on the line 2—2 of Fig. 1. Fig. 3 is a plan on the line 3—3 of Fig. 1 of the main and secondary levers. Fig. 4 is a section on the line 4—4 of Fig. 3. Fig. 5 is a detail of the rear end of the main lever. Fig. 6 is a front elevation of the pedestal of the secondary lever. Fig. 7 is a section on the line 7—7 of Fig. 6. Fig. 8 is an elevation of a link used in connection with this pedestal. Fig. 9 is a detail of the rack bar and the gear on the drum shaft. Fig. 10 is a cross section on the line 10—10 of Fig. 3. Fig. 11 is a front elevation of a pivot bar. Figs. 12, 13 and 14 are respectively sections on the lines 12—12, 13—13 and 14—14 of Fig. 10. Figs. 15, 16 and 17 are details of the upper end of the connection between the main lever and the pendulum.

Similar reference characters refer to like parts throughout the several views.

As in many scales on the market, the scale shown in the drawings has a base 1, a platform 2, a pedestal 3 on the base which pedestal carries a cylindrical case 4 having windows 5. The case carries bars 6 which support the pivot screws 7, which are the bearings of the shaft 8. On the shaft are the frames 9 which support the drums 10. Ends 11 of the case prevent damage and entrance of dust. The main lever 15 is provided with main knife-edges 16 which rest on the bearings 17 of the supporting brackets 18. The lever is counterweighted by the mass 19, preferably integral with the levers. The rear arm 14 of the lever is provided with a knife-edge 20 (Fig. 5) which rests on a bearing 21 carried by a hook 22 at the lower end of the rod 23. A second rear arm 24 of the main lever carries a pin 25 to which the lower end of the rack bar 26 connects. The teeth 27 at the upper end mesh with the irregular gear 28 on the shaft 8. The rack bar may be guided by the adjustable guide block 29 carried by the small frame 30.

Mounted in the pedestal 3 are bearings 32 which support the knife-edges 33 of the pendulum. This is formed of the pair of rods 34 and the weights 35. A cross bar at the pivot end of the pendulum has two arms, one of which, 36, has a knife edge 37, on which is suspended the rod 38 and counterweight 39. The other arm, 41, has a double plate connected to it, shown on an enlarged scale in Figs. 15 and 16. The upper part 42 has outer arms 43 which have downwardly projecting knife-edges 44, while the lower part 45 has inner arms 46 which have upwardly projecting knife-edges 47. These four knife-edges are in the same line as shown in Fig. 15.

A small bar 49 (Fig. 17) rests on the knife-edges 47 and is secured to the cross bar 50 which has bearings 51 for the knife-edges 44. When united, these two parts form a perfect hinge, practically free from friction. The rod 23 is connected to the cross-bar 50 by a pin 52. A secondary lever 53 is suspended on the main lever and has up-turned knife-edges 54 which receive the feet 55 at the front edge of the platform 2. The rear feet 57 of the platform rest on the knife-edges 58 of the main lever. The connection between the two levers is shown in Figs. 10 to 14 inclusive and in Fig. 3. The secondary lever has down-turned knife-edges 60 which rest on bearings 61 of the minor bar 62. Just below these bearings, the minor bar is supplied with knife-edges 63 which rest on bearings 64 carried by the major bar 65. The major bar has bearings 66 at its ends which rest on the knife-edges 67 of the main lever. These two bars constitute a link by means of which a portion of the effect of the load is transferred from the platform to the main lever through the secondary lever.

The rear arm 69 of the secondary lever has an upwardly projecting pivot pin 70 (Fig. 4) which engages in a socket in the lower end of the adjustable screw 71. This screw is mounted in a link 72 which carries a second screw 73 which has a socket in its upper end to receive the pivot pin 74 carried by a cross-bar 75 at the lower ends of the brackets 76 at the rear end of the base, just below the central line of the pedestal. Between the main link and the link 72 is a rod 78, connecting at its front end to the minor bar 62 by means of the pin 79, and at its forked rear end to the link 72 by means of the pins 80. This rod holds the main link parallel to the link 72. The arms of the secondary lever are shown to be of equal length so that the downward pressure on the pivots 67 of the main lever is twice that on the pivots 54 of the secondary lever. In such case, the pivot 67 is midway between the pivots 16 and 58. The vertical distance between the pivots 60 and 63 is preferably one half that between the bearings of the link 72, while the pivots 60 and 67 are preferably in the same line. Similarly, the pivots 63 are also in the same line as the pin 79, while the pins 80 are midway between the bearings of the link 72. The proportions of these parts may be changed as described, the governing factors being the arms of the secondary lever.

Since it is required that equal increments of weight on the platform shall move the drums through equal angular increments, then the angle through which the drum is required to turn will be a constant times the weight on the platform while the vertical movement of the rod 23 will be a constant times sine of the angle through which the pendulum turns, as will also be the case of movement of the rack bar 26, if we neglect the slight angular movements of these rods which in the mechanism shown are long in proportion to the movement of their ends, while the weight on the platform will be a constant times the tangent of the angle through which the pendulum turns. Hence, the angle through which the drum is required to turn is a constant times the tangent of the angle through which the pendulum turns. Therefore, the pitch line of the pinion cannot be a circle.

The curve of the pitch line of this gear may be termed a double spiral, symmetrical with the diameter in which the major radius vector lies. When the pendulum is vertical and the arm 41 horizontal, the major radius vector will be horizontal and in contact with the rack. The indicating drum will have turned one half revolution from its zero position. The length of this major radius vector equals $$\frac{a \tan. \phi}{\pi}$$

where $a$ is the length of the arm 41; $\phi$ is the angle through which the pendulum has swung when the drum has turned through an angle of 180 degress, and $\pi$ is 3.1416. For any other angle $\Theta$ of the pendulum less than $\phi$, the radius vector of the pitch line of the gear will equal $$\frac{a \tan. \phi \cos.^3 \Theta \left(1 + \frac{9 \tan.^2 \phi \sin.^2 \Theta \cos.^2 \Theta}{\pi^2}\right)^{\frac{1}{2}}}{\pi}$$

This formula to take into account all possible theoretical factors would require further correction to compensate for the error arising out of the angular movement of the rods 23 and 26. But as the error is usually practically negligible, these factors may be disregarded. This correction may readily be made by a special machine for generating the pinions. Because of the bar of the pendulum being in two parts, it can pass the weight rod 38 and the operating rod 23.

Many changes in the details of construction may be made by those skilled in the scale-maker's art without departing from the spirit of my invention.

Having now explained my construction, what I claim as my invention and desire to secure by Letters Patent is:—

1. In a scale, the combination of a lever to carry the load, a pendulum, connections between the lever and the pendulum, an indicating drum and the shaft therefor, a rack bar connected to the lever, and an eccentric gear on the drum shaft and engaging the rack bar, said gear so formed that the two parts on opposite sides of the major axis are equal.

2. In a scale, the combination of a lever to carry the load, a pendulum, connections between the lever and the pendulum, a revoluble indicator, a rack bar connected to the lever, and a gear secured to the revoluble indicator and meshing with the rack bar, said gear formed irregularly and proportioned so that the radius of that point of the pitch line in contact with the rack bar vary inversely with the angle between the pendulum and the vertical and so that the two parts on opposite sides of the major axis are equal.

3. In a scale, the combination of a lever and a pendulum connected thereto, a weight indicator, a rack bar connected to the lever, and an irregular gear connected to the weight indicator and in mesh with the rack bar, said gear so proportioned that the radius of the pitch line of the teeth so in mesh vary inversely with the angle of the pendulum with the vertical and are of equal length at equal angles on both sides of the major axis.

4. In a scale, the combination of a lever, a pendulum normally held in elevated position, connections between the lever and pendulum whereby loads on the scale will cause the pendulum to swing down and then up through a vertical arc, a weight indicator, a rack bar connected to the lever, and an irregular gear connected to said indicator and meshing with the rack bar, the radius of the pitch line of the gear in contact with the rack bar decreasing as the pendulum swings either way from the vertical.

5. In a scale, the combination of a lever, a pedestal, a pendulum pivoted thereon, arms connected to said pendulum at right angles thereto, a link connecting the lever to one arm of said pendulum, a counter-weight suspended from the other arm to hold the pendulum normally elevated, a weight indicator, a rack-bar connected to said lever, an irregular gear connected to said indicator, the radius of the pitch line of the gear in contact with the rack bar varying inversely with the angle between the counter-weight carrying-arm and the horizontal.

6. In a scale, the combination of a lever and an indicator connected thereto, a pedestal, bearings mounted thereon, a pendulum supported by the bearings, an arm connected to the pendulum and provided with a plurality of pivots in line with and facing each other, a rod connected to said lever, and a cross head at the upper end of the rod provided with opposite bearings for said pivots on said arm a second arm connected to the pendulum opposite the first, and a counter-weight connected thereto.

7. In a scale, the combination of a lever and an indicator connected thereto, a pedestal, bearings mounted thereon, a pendulum supported by the bearings, an arm connected to the pendulum, a pair of plates secured to the arm, each having a plurality of knife-edge pivots and the pivots of the plates facing each other and forming a straight line, a cross head formed of a plurality of bars each having a plurality of bearings to receive said knife-edge pivots, and a rod connecting the cross-head to the levers.

In testimony whereof I have signed this specification in the presence of two subscribing witnesses.

FREMONT H. BUCKINGHAM.

Witnesses:
GEORGE E. RENTON,
ELIZABETH M. BROWN.